United States Patent [19]

Larson

[11] Patent Number: 4,611,944

[45] Date of Patent: Sep. 16, 1986

[54] LOCKBODY MECHANISM

[75] Inventor: Wallace H. Larson, Jamestown, N. Dak.

[73] Assignee: Western Gear Corporation, Jamestown, N. Dak.

[21] Appl. No.: 578,483

[22] Filed: Feb. 9, 1984

[51] Int. Cl.[4] ............................ F16B 7/06; F16D 1/12
[52] U.S. Cl. ...................................... 403/60; 403/78; 403/83; 403/118; 403/164; 244/137 A
[58] Field of Search .................. 403/78, 164, 165, 83, 403/84, 350, 53, 59, 60, 118; 244/137 A

[56] References Cited

U.S. PATENT DOCUMENTS

| | | | |
|---|---|---|---|
| 772,456 | 10/1904 | Chandler | 403/60 |
| 836,392 | 10/1906 | Mead | 403/118 |
| 951,354 | 3/1910 | Wood | 403/118 |
| 1,003,355 | 9/1911 | Green | 403/60 |
| 1,374,348 | 4/1921 | Barrel | 403/60 |
| 2,087,174 | 7/1937 | Stone | 403/118 X |
| 4,304,078 | 12/1981 | Meriwether, Jr. | 403/53 X |

FOREIGN PATENT DOCUMENTS 417146 12/1947 Italy ...................................... 403/60

Primary Examiner—Thomas F. Callaghan
Assistant Examiner—Todd G. Williams

[57] ABSTRACT

A variable length mechanical connection having a selectable fixed length obtainable by permitting at least one of three relatively axially movable body members to selectively rotate relative to the other body members under axially applied loads.

12 Claims, 4 Drawing Figures

LOCKBODY MECHANISM

BACKGROUND OF THE INVENTION

This invention relates to a mechanical connection having a length which is variable along an axis and which length can be selectively fixed at a desired length.

At the present time it is the practice in arming aircraft to secure an individual store to a suitable structural component of an aircraft so that the store is secure with respect to the loads which are imposed upon the store during the operation of the aircraft. As is known, various stores are carried in various locations on an aircraft, such as under the wings or the main body of the aircraft, and the configuration of the various stores differs one from the other. Obviously since airborne stores can be explosive devices, such as rockets and bombs, considerable care must be exercised to insure that each store is properly secured with respect to its particular location on or in an aircraft. Heretofore it has been the practice to secure each store with respect to an aircraft by a pair of swaybraces located in the structure carrying the store. In view of the necessity of properly securing a store the swaybars or swaybraces are normally rigid members which, in view of the various configurations of stores, requires the swaybraces to essentially be adjustable for a particular store in a particular location on a particular aircraft. Swaybraces normally have pads at each of their ends which are adjustable by a bolt and nut. The time required for adjusting each nut and bolt for various stores is longer than desired for efficient swaybracing.

BRIEF SUMMARY OF THE INVENTION

In view of the above difficulties with swaybraces a mechanism has been invented which has an adjustable length which can be selectively fixed and selectively readjusted. In particular the mechanism of this invention consists of three body members aligned along an axis with the intermediate member being freely axially positionable with respect to the other members when the three members are in an unlocked position and which intermediate member is rigidly secured with respect to one of the members when the three members are in a locked position. More particularly one body member is fixed in an axial position and supports the intermediate member. The third member is moved axially with respect to the intermediate member to cause the intermediate member to rotate with respect to the first member. As desired, the intermediate member is engageable with the first member such that the relative axial position of the first and intermediate members becomes fixed. In addition, when the third member is independently secured against axial movement, additional axial loading between the first member and the third member is obtained by further movement of the first member.

Accordingly, one object of this invention is to provide a new and improved elongated, multi-part mechanism having a selectively variable axial length.

Another object of this invention is to provide a new and improved elongated, multi-part mechanism having a selectively variable axial length which can exert a preselected axial force between the ends thereof when the ends are fixed.

A more specific object of this invention is to provide a new and improved three piece mechanism having a variable axial length which length can be selectively varied by means of an intermediate selectively rotatable member.

Still another object of this invention is to provide a new and improved three piece mechanism having a variable axial length which length can be selectively varied by means of an intermediate selectively rotatable member having a controlled preselected axial force with the other mechanism pieces.

These and other objects of this invention will be better understood in view of the following description and illustrative drawings of a presently preferred embodiment of the invention in which.

BRIEF DESCRIPTION OF A PREFERRED EMBODIMENT

Figure 1:
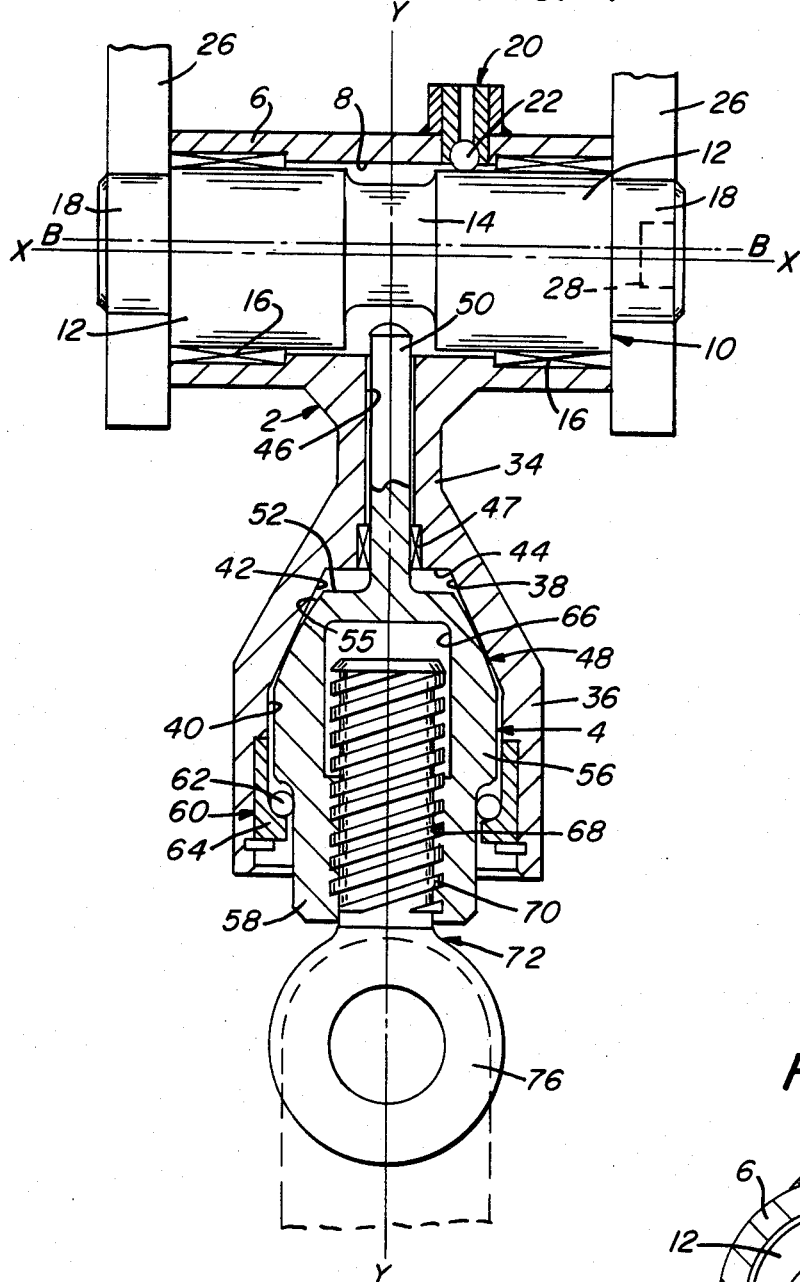
FIG. 1 is a partial cross sectional and partial side elevational view of a mechanism constructed in accordance with the principles of this invention in the locked position.
Figure 3:
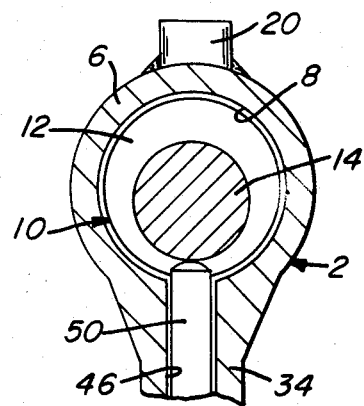
FIG. 3 is a partial cross sectional and partial side elevational view of the mechanism as shown in FIG. 2 taken along lines A—A thereof.
Figure 2:
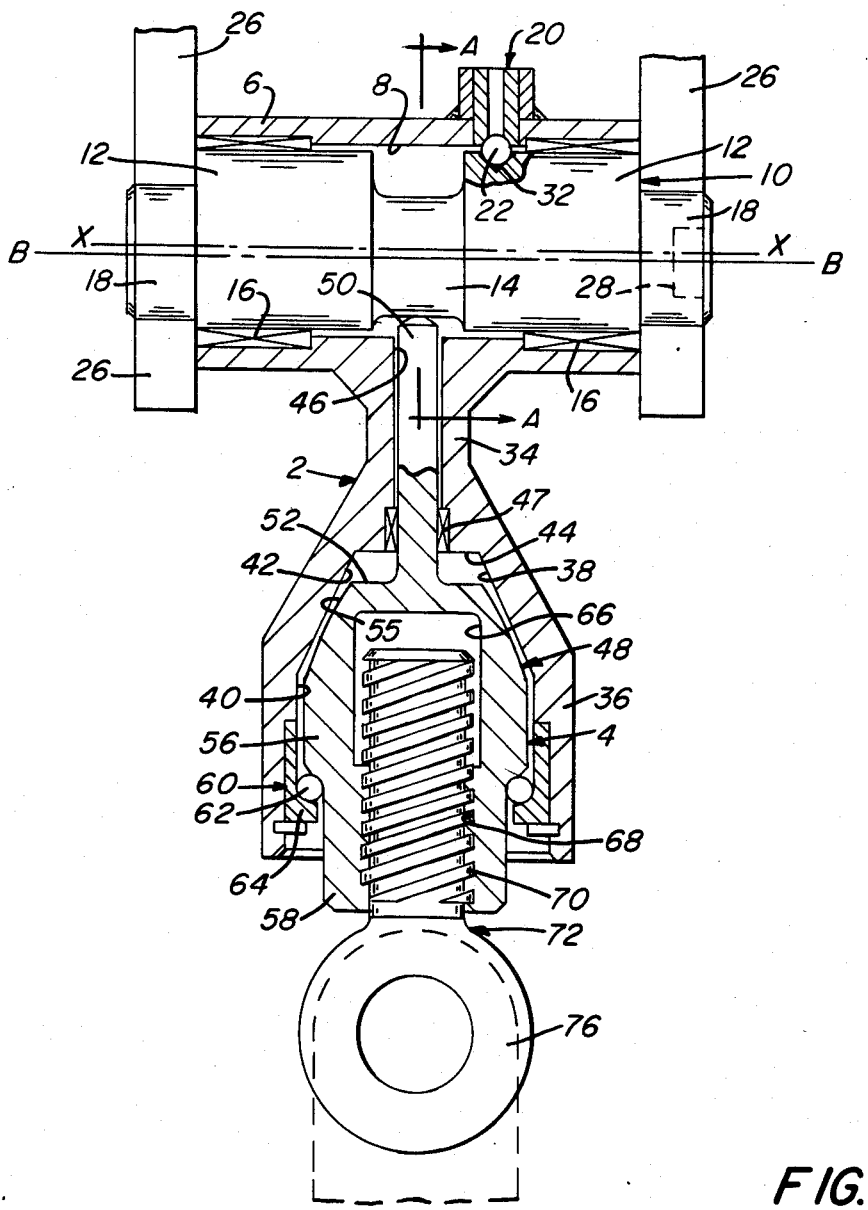
FIG. 2 is a view which is the same as FIG. 1 except that the mechanism of FIG. 1 is in the unlocked position.
Figure 4:
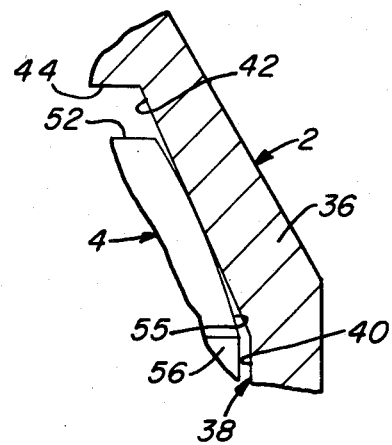
FIG. 4 is an enlarged view of the engaged surface portions of the mechanism as shown in FIG. 1.

The illustrated mechanical connection of this invention, which for convenience can be referred to as a lockbody mechanism, consists of formed female and male body members 2 and 4, respectively. Body 2 is formed to provide an elongated upper portion 6 having an open ended bore 8 extending centrally therethrough which bore 8 rotationally receives a cam shaft 10 for controlling the locking and unlocking of the body portions 2 and 4. Cam shaft 10 is a unitary member having, within bore 8, axially spaced cylindrical rotationally supported end portions 12 which are axially connected by an intermediate eccentric cylindrical camming portion 14. To provide eccentricity of the camming portion 14 the longitudinal central axis B—B of portion 14 is radially offset from the longitudinal central axis X—X of shaft 10—central axes X—X also being coincident with the longitudinal central axis of bore 8. Portions 12 are rotationally supported on their outer periphery by suitable bearings 16 suitably carried at the ends of bore 8. Shaft 10 has cylindrical portions 18 of reduced diameter extending outwardly of end portions 12 to permit shaft 10 to be rotationally received in opposed complementary bores of a suitable supporting structure 26, shown in part. One or both of portions 18 have suitable inwardly extending sockets 28 to permit shaft 10 to be suitably manually rotated via a suitable manually held socket wrench. Upper portion 6 supports a suitable detent mechanism 20 which, as shown, includes a ball 22 in rotational engagement with the outer surface of one of the portions 12 and which when in alignment therewith is received in a suitable upwardly open seat 32 in such one portion 12 in a well known manner. As shown in FIG. 2, ball 22 engages a seat 32 in the unlocked position; however, additional seats 32 (not shown) for different relative rotational positions may be provided as desired in portions 12. The central axes of cylindrical portions 18 are axially aligned and coincident with the central axis B—B so that upon rotation of shaft 10 through one hundred and eighty degrees (180°)

the camming portion 14 is simultaneously rotated 180° and body 2 moves upwardly, with respect to the showing in FIG. 1, twice the linear radial distance of the eccentricity between axes B—B and X—X.

Body 2 has an integral downwardly extending portion 34 intermediate the axial length of bore 8 which flares outwardly at its lowermost end to provide a lower female housing portion 36 having a formed upwardly extending downwardly open bore 38 therein. Bore 38 has a lowermost cylindrical bore portion 40 which terminates at its upper end into an axially inwardly tapered bore portion 42 with the upper end thereof terminating in an uppermost transversely extending flat portion 44. The uppermost portion of bore 38 consists of an elongated open ended bore portion 46 extending from flat portion 44 to bore 8. All portions 40, 42 and 46 of bore 38 are coaxial with each other along a vertical central axis Y—Y. Axis Y—Y also lies in the central transverse plane of camming portion 14. Bore 38 receives the male body member 4 which is a formed vertically elongated traveling member rotationally supported within bore 38.

Body 4 has an elongated upwardly extending shaft portion 50 with the upper free end thereof projecting within bore 8. Suitable bearings 47 carried at the lower end of bore portion 46 rotationally support shaft portion 50 in bore portion 46. The lower end of shaft portion 50 terminates in a transversely extending flat portion 52 on body 4 which is spaced downwardly from flat portion 44 in all relative positions between body members 2 and 4 as hereinafter described. Extending downwardly from the outer periphery of flat portion 52 is a portion having a spherical outer surface 55 which is cooperable with the tapered portion 42. An upper cylindrical portion 56 of body 4 extends downwardly from the lower end of spherical surface 55 and terminates at the lower end thereof in a lowermost cylindrical portion 58 of smaller cross section than portion 56 to permit a suitable bearing structure 60 to be carried by the lower end of housing portion 36 to rotationally support the cylindrical portion 58 of body 4. Bearing structure 60 includes a suitable plurality of circumferentially spaced balls 62 which are rotationally and captively carried by an upwardly facing race 64 of bearing structure 60. Balls 62 rotationally engage the outer surface of cylindrical portion 58 and, in the unlocked position, FIG. 2, also rotationally engage the downwardly facing juncture between cylindrical portions 56 and 58. The inwardly facing surface of race 64 is cylindrical and in axial alignment with the cylindrical surface of bore portion 40.

Body 4 has a central, downwardly open bore 66 therein which extends upwardly therein to a location downwardly adjacent the flat portion 52. The lower portion of bore 66 is provided with a female threaded portion 68 to receive the male threaded portion 70 of the third member of the mechanism—i.e., anchor bolt 72. The upper portion of bore 66 is transversely enlarged to permit the upper end of bolt 72 to freely rotate therein. In order to accomplish the purposes of this invention the threaded portions 68 and 70 are of a class to permit body 4 to rotate relatively freely with respect to bolt 72 upon the application of an axial load to bolt 72 in either axial direction within the axial limits of operable relative travel therebetween and providing body members 2 and 4 are unlocked from each other to permit such relatively free rotation therebetween. In practice and as illustrated, a 5 start Acme thread has proven to be satisfactory for the threaded portions 68 and 70.

Although the anchor bolt 72 may have a lower end of any suitable configuration, an eyelet portion 76 is shown since such configuration is common in the environment in which a lockbody of this invention is used.

In use the lockbody mechanism of this invention is rotationally secured to a suitable rigid supporting structure 26, such as an ejector unit as is normally carried by an armable aircraft, by means of cylindrical portions 18. Then, with shaft 10 being in the unlocked position (FIG. 2) so that spherical surface 55 does not contact the surface of the tapered bore portion 42, the eyelet portion 76 of bolt 72 is pulled axially outward or pushed axially inwardly until it is approximately aligned with a desired portion of a structure for supporting an armed store. During such axial movement of bolt 72 the body 4, since it is unlocked, rotates freely within housing portion 36 to permit the eyelet portion 76 to be positioned, as selected, axially outwardly of body 4. Once the anchor bolt 72 is so located the shaft 10 is rotated from the unlocked to the locked position. In so rotating shaft 10 the camming portion 14 moves out of engagement with the upper end of shaft 50 and the body member 2 is moved downwardly a distance equal to twice the eccentricity of the camming portion 14 from axis X—X. By proper design the first segment of rotation of shaft 10 causes the surface of tapered portion 42 to move into engagement with the spherical surface 55 on body member 4 to lock the body members 2 and 4 against axial movement with respect to each other. The remaining segment of rotation of shaft 10 creates an axial load between member 2 and bolt 72 thus causing a locked preloaded condition between the structure 26 and any member affixed to bolt 72. Upon rotation of shaft 10 one hundred and eighty degrees (180°) from the unlocked position the ball 22 of detent 20 engages a seat 32 (not shown) so that an operator can tell when the shaft 10 is in the desired locked position, i.e., one hundred and eighty degrees (180°) from unlocked. Although cam portion 14 has been described as being of circular cross section, those familiar with the kinematic design of cam surfaces will clearly understand that other cross sectional configurations of cam portions 14 can be readily utilized. In addition the outer surface of cam portion 14 can readily be designed to obtain various selected displacements of body 2 and preloading.

As described, the engagement of the spherical surface 55 with the surface of portion 42 provides the locking engagement. Inasmuch as such surfaces move axially with respect to each other to obtain locking and unlocking, one of the surfaces is a spherical surface to prevent binding or wedging of the surfaces which would interfere with the separation of the surfaces.

In view of the axial relative movement described it will be appreciated that the portions of bore 38, the outer and inner surfaces of body 4 and the threading engagement of portions 68 and 70 all occur along the central vertical axis Y—Y. Further, although a 5 start Acme thread has proved to be satisfactory, it will be realized that the thread must be such that the coefficient of friction between the engaged thread surfaces cannot exceed the tangent of the thread angle of the engaged thread surfaces. Accordingly, any threaded connection permitting the body 4 to rotate on threaded portion 70 is satisfactory for the purposes of this invention.

The various members of the structure of this invention can be fabricated in well known manners from a wide variety of known materials. In applications where structural strength is important, such as aircraft, alloy steels can be used to form the members of the mechanism; however, if desired, the same structure can be fabricated from various non-ferrous metal or plastic materials depending upon the requirements of a particular application. Although I have described a particular structure incorporating the invention of this application, it will be realized that various structures can be utilized to move the body members 2 and 4 axially relative to each other into and out of locking engagement. Throughout this description the terms upward, downward, outward, inward or the like have been used in describing the structure as illustrated. Such terms have been used for convenience only as the mechanism of this invention is operable along any axis and is not limited to relative vertical movement along a vertical axis as shown.

Having described a presently preferred embodiment of this invention in accordance with the Patent Statutes and having set forth that modifications can be made thereto, those skilled in the art will be cognizant of the fact that various modifications can be made without departing from the spirit and scope of this invention. Accordingly, the following claims are to be construed as including modifications of the structures as would be known to those skilled in the relevant art.

The cone angle of the inner surface of portion 42 is selected with reference to the spherical radius of surface 55 to provide the desired locking and unlocking of members 2 and 4. For such purposes and with the spherical radius of surface 55 providing a small crown on body member 4, a cone angle of twenty-four degrees (24°) has proven to be satisfactory. With a 24° cone angle the tapered opening of portion 42 is wide enough to permit surface 55 to readily disengage or separate from the inner surface of portion 42 while firmly retaining member 4 by the engagement of surface 55 with the inner surface of portion 42. It is to be noted that a cone angle of 24° is a preferred angle; however, any cone angle which provides the necessary locking and unlocking action as heretofore described can be utilized.

I claim:

1. A mechanism comprising,
   a first member having an elongated first bore extending inwardly thereof along an axis with at least one end of said bore being open and facing in one axial direction;
   a second member having at least an elongated portion thereof supported by said first member for rotation within said first bore;
   said second member having an elongated second bore extending inwardly thereof in coaxial alignment with said axis and with an open end thereof facing in said one axial direction;
   a third member having at least an elongated portion thereof received within said second bore in coaxial alignment with said axis;
   said elongated portion of said third member and said elongated second bore having cooperable means to permit said second and said third members to rotate relative to each other and to permit said third member to move in either axial direction along said axis with respect to said second member;
   said third member having a portion located outwardly of said second bore which is adapted to be secured to a rigid structure;
   and a selectively actuatable means carried by said first member for selectively moving said first member into and out of engagement with said elongated portion of said second member, with said second member being restrained from rotation with respect to said first member and said third member when said first member engages said elongated portion of said second member, and with said elongated portion of said second member being free to rotate within said first bore when said first member is out of engagement with said elongated portion of said second member.

2. A mechanism as set forth in claim 1 in which said cooperable means consists of female and male threads integral with said second bore and said elongated portion of said third member respectively.

3. A mechanism as set forth in claim 2 in which said cooperable means is a five start Acme thread.

4. A mechanism as set forth in claim 2 in which the coefficient of friction between the thread surfaces of said male and female threads is less than the tangent of the start angle of said male and female threads.

5. A mechanism as set forth in claim 1 wherein said first bore has a conical inner surface coaxial with said axis which is tapered in an axial direction opposite said one axial direction and said conical inner surface being engageable with said elongated portion of said second member.

6. A mechanism as set forth in claim 5 wherein said conical inner surface has a cone angle of 24°.

7. A mechanism as set forth in claim 5 wherein the surface of said elongated portion of said second member engageable with said surface of said first member is a spherical surface.

8. A mechanism as set forth in claim 1 wherein said actuatable means includes a movable cam means and a cam follower on said second member.

9. A mechanism as set forth in claim 8 wherein said cam means is rotatable about an axis perpendicular to said first mentioned axis.

10. A mechanism as set forth in claim 1 wherein said first member carries means to indicate when said first and second members are in or out of engagement with each other.

11. A mechanism as set forth in claim 1 wherein said actuatable means is rotatably supported with respect to fixed means.

12. A mechanism as set forth in claim 1 wherein the force level between said actuatable means and said first member can be selectively varied when said actuatable means and said first means are in engagement with each other.

* * * * *